Dec. 25, 1951  L. E. PERRINE  2,579,512
REFRIGERATING APPARATUS AND METHOD
Filed May 8, 1946
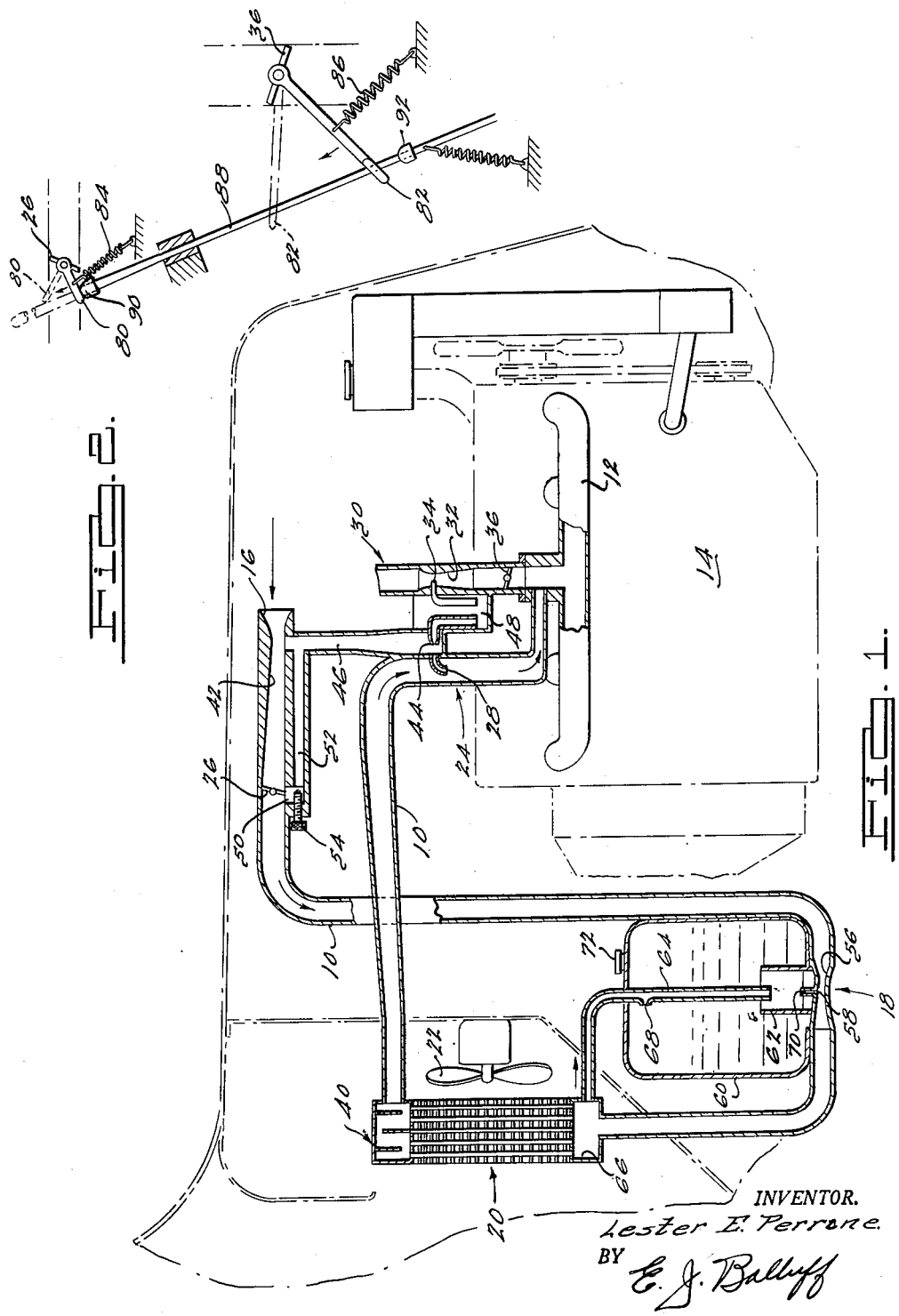
INVENTOR.
Lester E. Perrine.
BY
*E. J. Balluff*
ATTORNEY.

Patented Dec. 25, 1951

2,579,512

UNITED STATES PATENT OFFICE 2,579,512

REFRIGERATING APPARATUS AND METHOD

Lester E. Perrine, Highland Park, Mich.

Application May 8, 1946, Serial No. 668,227

6 Claims. (Cl. 62—117)

This invention relates in general to refrigerating apparatus and methods, and in particular to a simple and economical apparatus, system and method of low initial cost for providing refrigeration in connection with a means, such as an internal combustion engine, which provides a source of gas, such as air, at subatmospheric pressure.

More particularly the invention is related to refrigeration by evaporation at subatmospheric pressure and as illustrated in the embodiment of the invention selected for purposes of illustration, is related to passenger car air conditioning in which the subatmospheric air normally present in the engine intake manifold is used to increase the evaporation of a refrigerant, such as water.

By subatmospheric evaporation of the water in the presence of the air, not only is the cooling capacity greatly increased over evaporation in atmospheric air, but a high degree of cooling is available even when the initial atmospheric air is saturated with moisture and therefore would offer no cooling at atmospheric pressure.

If water or other low cost refrigerant is used, it may be disposed of in vapor form and hence no condenser would be required, the internal combustion engine of the car serving as a pump or compressor and the refrigerant vapor being disposed of through the engine exhaust system. According to this system, no engine power is used to operate the system, and there is no loss of engine cooling due to condensers obstructing the engine radiator.

Accordingly, principal objects of the invention are to provide:

A new and improved refrigerating system;

A new and improved method of obtaining refrigeration;

A new and improved system of refrigerating space to be cooled in a vehicle employing an internal combustion engine as a source of motive power;

A refrigerating system and method of the type disclosed which is characterized by simplicity of construction, its efficiency of operation, and the low initial cost involved in building such a system.

Other and further objects of the invention will be apparent from the following description and claims and will be understood by reference to the accompanying drawing, of which there is one sheet, which, by way of illustration, shows a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a schematic illustration of a system embodying the invention illustrated in connection with an automotive vehicle; and Fig. 2 is a schematic diagram of the carburetor throttle controls associated with the system.

As illustrated in the drawings, a system embodying the invention comprises an air conduit 10 connected at one end to the induction system 12 of an internal combustion engine 14 and having an air inlet 16 at its other end thereof. Means comprising a refrigerant carburetor indicated generally at 18 are associated with the conduit for mixing and substantially saturating the air flowing through said conduit with a refrigerant, such as water, a portion of the conduit between said refrigerant carburetor and the induction system 12 forming a heat exchanger indicated generally at 20 for the refrigerant saturated air flowing through the conduit.

The heat exchanger 20 is arranged for absorbing heat from the space in the vehicle to be cooled, and as illustrated may be arranged inside the body of the vehicle and have a motor driven fan 22 associated therewith for circulating the air inside of the body over the coils of the heat exchanger 20 for absorbing heat from the air inside of said body.

A fuel carburetor indicated generally at 24 and hereinafter referred to for convenience as an auxiliary carburetor, has its throttle 26 arranged in the conduit 10 within the air inlet 16 thereof and a fuel jet 28 arranged in the air conduit 10 downstream relative to said heat exchanger 20.

Another fuel carburetor for the engine 14, hereinafter referred to for convenience as the main carburetor and indicated generally at 30, is connected to the induction system 12 ahead of the point of connection of the conduit 10 thereto. The main carburetor 30 includes a venturi 32 having a fuel jet 34 therein and a throttle 36 forming a means by which the fuel supply from the carburetor 30 to the induction system is controlled.

The auxiliary carburetor 24 as illustrated is of the anterior throttle type in which fuel is emitted to the air after the air has passed the throttle 26 thereof.

The refrigerant carburetor 18, cooling coil 20 and a separator indicated generally at 40 are arranged in series in the conduit 10 after the throttle 26 but ahead of the fuel jet 28 of the carburetor 24. A suitable venturi 42 is arranged upstream of the throttle 26 to impress proper vacuum upon the fuel jet 44 through a passage 46 connecting the throat of the venturi with the space in which such jet 44 is arranged. The jet 44 is arranged like the jet 34 to be supplied with fuel from a fuel reservoir (float chamber) 48 which in turn is suitably connected to the fuel supply and storage system of the vehicle. The jet 28 arranged in the conduit 10 communicates with the space in which the jet 44 is arranged.

The passage 46 is of a size such as to maintain essentially venturi throat depression in the space in which the fuel jet 44 is arranged. The jet 44 may be of the order of one-sixteenth ($\frac{1}{16}$) inch diameter. The jet 28 may be of the order of one-eighth ($\frac{1}{8}$) inch diameter. By this means fuel supplied by the jet 28 to the conduit 10 is metered by the venturi 42 but remote therefrom, thus permitting the refrigerant carburetor 18 and cooling coil 20 and separator 40 to be placed between the throttle 26 and the jet 28 without affecting the metering of the fuel by the jet 28 to the conduit 10.

As the engine would preferably idle off the auxiliary carburetor 24 so as to give maximum cooling at idle and low speed, means to adjust the idle fuel mixture are provided, and this comprises a slot 50 arranged to straddle the throttle 26, a passage 52 connecting this slot 50 to the air passage 46 and an adjustable valve number 54 cooperable with a port formed by the end of the passage 52 for regulating the flow of air through passage 52 and slot 50. Fuel for the auxiliary carburetor may be provided by a separate fuel reservoir or as illustrated by a tube from the main carburetor fuel bowl 48.

The refrigerant carburetor 18 comprises a venturi 56 of a size adequate to pass the air flowing through the conduit 10 and a jet 58 arranged to supply refrigerant, such as water, from a tank 60. The tank 60 serves as a storage tank and includes a cold refrigerant return chamber 62 into which excess liquid refrigerant is returned by a conduit 64 connected to a tank 66 at the bottom of the heat exchanger 20. The separator 40 functions to remove from the air flowing through the conduit excess liquid which collects in the tank 66 and is returned therefrom by the conduit 64 to the chamber 62.

As the tank 60 operates at subatmospheric pressures, it is sealed from atmosphere and vented at the top by an opening 68 into the excess refrigerant return conduit 64. A small passage 70 near the bottom of the return chamber 62 permits flow from the tank 60 to the chamber when the supply in the tank is below the open top of the chamber. A filling cap 72 is provided so that the tank may be filled with refrigerant, such as water, as required.

The heat exchanger 20 may consist of a series of finned tubes extending between the tank 66 and the separator 40, the interior of such tubes forming a part of the conduit 10 and the tubes being spaced so that air may be circulated thereover in heat exchange relationship with the fluid inside the tubes by the fan 22.

The jet 58 may be of the order of one-eighth ($\frac{1}{8}$) to one-sixteenth ($\frac{1}{16}$) inch in diameter. The port between the throat of the venturi 42 and the passage 46 may be of the order of one-half ($\frac{1}{2}$) inch in diameter, and the fuel jet 34 may be of the order of one-sixteenth ($\frac{1}{16}$) inch in diameter. The dimensions given are used merely to indicate the relative sizes of the various jets and orifices.

The law of partial pressures states that in a mixture of air and water vapor, each acts as though the other were not present. Thus, in an atmosphere of air and water the normal car engine could be treated as a vapor pump, the capacity of which would be the pumping displacement of the engine. From the law of partial pressures it is evident that for saturated mixtures the air flow is equal to the vapor flow in volume. The air flowing through the conduit 10 will be substantially saturated with a refrigerant, such as water, by means of the refrigerant carburetor 18, the vaporization of the refrigerant functioning to cool the air in the conduit 10 before it flows through the heat exchanger 20.

The throttles 26 and 36 of the carburetors each include operating arms 80 and 82 having springs 84 and 86 associated therewith so as to normally bias the throttles 26 and 36 to their closed positions. A slidable rod 88 having abutments 90 and 92 is slidably arranged so as to open the throttle 26 before the throttle 36 is opened upon movement of the rod 88 in one direction, and to permit the throttle 36 to close before the throttle 26 closes upon movement of the rod 88 in the opposite direction. The rod 88 is connected to a suitable pedal or device within the vehicle so that the operator thereof may control and vary the openings of the throttles 26 and 36 in accordance with the desires and load requirements of the vehicle.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:

1. A refrigerating system operable for cooling space in a vehicle having an internal combustion engine for propelling the same, said engine having an induction system and a carburetor associated with said induction system for supplying fuel thereto, said carburetor having a throttle, said refrigerating system comprising an air conduit connected at one end to said induction system downstream relative to said throttle, said air conduit having an air inlet at the other end thereof, means associated with said conduit for mixing and substantially saturating the air flowing through said conduit with refrigerant, a portion of said conduit between said means and the connection between the conduit and the induction system forming a heat exchanger for the refrigerant saturated air flowing through the conduit, said heat exchanger being arranged for absorbing heat from the space in the vehicle to be cooled, an auxiliary carburetor having its throttle arranged in said air inlet and a fuel jet arranged in said air conduit downstream relative to said heat exchanger, and operating means connected to said throttles in such a manner so as to open the throttle of said auxiliary carburetor before the other throttle is opened and to close said throttles in the reverse order.

2. A refrigerating system according to claim 1 wherein said means for mixing and substantially saturating the air flowing through said conduit comprises a refrigerant carburetor, a refrigerant reservoir is arranged to supply refrigerant to said caburetor, a refrigerant separator is associated with said conduit downstream relative to said refrigerant carburetor, and a refrigerant return extends between said separator and reservoir.

3. In combination with the induction system of an internal combustion engine having a carburetor arranged for supplying fuel thereto, a refrigerating system comprising an air conduit having an air inlet at one end and connected at its other end to said induction system downstream relative to said carburetor so as to produce flow of air through said conduit at subatmospheric pressure during operation of said engine, an auxiliary carburetor constructed and arranged for supplying and metering fuel into said conduit, a carburetor for supplying a refrigerant to the air flowing through said conduit so as to mix and substantially saturate such air with refrigerant vapor, a portion of the conduit forming a heat exchanger for the refrigerant saturated air flowing therethrough, each of said fuel carburetors having a throttle for controlling the same, the throttle of said auxiliary fuel carburetor being arranged in said air inlet and operating means connected to said throttles in such a manner so as to open the throttle of said auxiliary carburetor before the other throttle is opened and to close said throttles in the reverse order.

4. Apparatus as defined in claim 3 wherein said refrigerant comprises water.

5. In combination with the induction system of an internal combustion engine, a refrigerating system comprising an air conduit having an air inlet at one end and connected at its other end to said induction system so as to produce flow of air through said conduit at subatmospheric pressure during operation of said engine, a carburetor for metering fuel into said conduit, a carburetor for supplying a refrigerant to the air flowing through said conduit so as to mix and substantially saturate such air with refrigerant vapor, a portion of the conduit forming a heat exchanger for the refrigerant saturated air flowing therethrough, a refrigerant supply tank sealed from atmosphere, a liquid refrigerant separator arranged downstream in said conduit relative to said refrigerant carburetor; a cold refrigerant return chamber within the refrigerant tank, an excess refrigerant return from said separator to said chamber, a restricted orifice providing a connection between said refrigerant carburetor and said refrigerant return chamber, said refrigerant carburetor and excess return comprising a pump for supplying cooling liquid to said heat exchanger.

6. A refrigerating system operable for cooling space in a vehicle having an internal combustion engine for propelling the same, said engine having an induction system and a fuel carburetor including a throttle associated with said induction system for supplying and regulating the supply of fuel thereto, said refrigerating system comprising an air conduit which is continuously open during operation of said system for the continuous flow of air therethrough, said conduit being connected at one end to said induction system and having an air inlet at the other end thereof, said throttle being arranged within said air inlet for continuously metering the flow of air into said conduit and to expand the air flowing through said conduit, refrigerant carburetor means associated with said conduit for mixing and continuously substantially saturating the air flowing through said conduit with a refrigerant other than the fuel on which said engine operates, a portion of said conduit between said refrigerant carburetor means and the induction system forming a heat exchanger for the refrigerant saturated air flowing through the conduit, said heat exchanger being arranged for absorbing heat from the space in the vehicle to be cooled, a refrigerant separator associated with said heat exchanger, and means for returning refrigerant from said separator to the refrigerant supply for said refrigerant carburetor means.

LESTER E. PERRINE.

REFERENCES CITED

The following references are of record in the file of this patent:

UNITED STATES PATENTS

| Number | Name | Date |
|---|---|---|
| 2,136,527 | Stelzer | Nov. 15, 1938 |
| 2,311,512 | Backstrom et al. | Feb. 16, 1943 |